United States Patent Office 2,793,137
Patented May 21, 1957

2,793,137

PROCESS OF SETTLING FLUORESCENT SCREENS

Arnold I. Friedman, Cleveland, Ohio, assignor to General Electric Company, a corporation of New York No Drawing. Application April 20, 1950,
Serial No. 157,185

1 Claim. (Cl. 117—33.5)

The present invention relates to improvements in depositing fluorescent screens and particularly to the depositing of such screens on a glass or glass-like surface such as the face of a cathode ray tube by a liquid settling process.

As the volume of cathode ray tubes manufactured has increased due to the expansion of the television receiver business, the need for improved processes for producing the luminescent screen of such cathode ray tubes has greatly increased. In accordance with one general type of process now in use, a suspension of phosphor particles is settled through a water solution of a silicate such as potassium or sodium silicate in which a material called an electrolyte has been dissolved. In accordance with this process, the phosphor settles to the tube face and is held in place by the sodium or potassium silicate which acts as a binder. The electrolyte in general speeds up the process and decreases the time required before the excess liquid may be poured off without disturbing the screen. In accordance with the present invention alkaline earth salts are employed in the general type of process described above with the result that the time required for depositing the screens before the liquid may be poured off is decreased and the quality and uniformity of the screens is improved.

While, in its broader aspects, the present invention is not dependent upon any particular theory as to what happens when these alkaline earth salts are employed, tests indicate that instead of merely acting as an electrolyte which hastens the gelation of the potassium silicate or sodium silicate of the solution it enters into chemical reaction with the potassium or sodium silicate to form an alkaline earth silicate precipitate which acts as a binder.

While the use of alkaline earth compounds generally in screening by liquid settling are envisioned as within the scope of my invention many of these compounds are effectively ruled out for one reason or another. For example, many of the alkaline earth salts are so insoluble in water as to prevent or render difficult the attainment of even the low concentrations required for the successful carrying out of the process of the present invention. Some of the compounds are too expensive to be feasible commercially and others such as the alkaline earth halogens are entirely effective for the screening process but may have a detrimental effect under some circumstances on oxide coated cathodes. They may be used, however, if a bare tungsten cathode, for example, is to be employed and sometimes even with oxide coated cathodes. As far as solubility is concerned the alkaline earth nitrates, formates, acetates, propionates, butyrates, halides and hydroxides may be used and of these the nitrates, acetates and halides of barium, strontium and calcium are suitable. Since strontium is expensive and the chlorides are detrimental to oxide coated cathodes, as mentioned above, the nitrates and acetates of barium and calcium represent a smaller and preferred group of materials and by balancing all considerations it is concluded that barium nitrate and barium acetate represent the best alkaline earth compounds for purposes of the present invention.

The process is not limited in its application to settling a specific phosphor and may be used, for example, with zinc sulphide-zinc cadmium sulphide phosphors, zinc silicate phosphors (Willemite), magnesium silicate phosphors, zinc beryllium silicate phosphors, and zinc oxide phosphors.

My invention will be better understood by considering the following specific example of its application to the screening of a 10" cathode ray tube. The bulb is first supported in an upright position with the face down and 385 cc. of .4% barium nitrate solution (water solution) is added to the bulb. Next, 2000 cc. of deionized water are added to the bulb to form what is called the cushion. When the cushion water has become motionless, a phosphor suspension made up of 2.4 grams of the powdered phosphor, 300 cc. of potassium silicate solution and 300 cc. of water are poured on the cushion water and the liquid allowed to settle for the time required to permit pouring off of the liquid. This varies with the temperatures involved and the size of the bulb. At a temperature of 26° C. to 30° C. approximately one half hour of settling is required. This time may be reduced substantially by the proper application of heat to the bulb face. The application of heat to the bulb face in order to accelerate the screening process is described and claimed in U. S. Patent No. 2,662,829 issued December 5, 1953 to P. W. Krause and assigned to the same assignee as the present invention. As is well understood, the liquid may be poured off by slowly tilting the bulb at a speed, for example, of approximately 20° per minute. Speeds within the range of 13° to 57° per minute have been employed successfully.

In the above example the actual weight of the barium nitrate is equal to 1.54 grams and the total liquid to approximately 3 liters providing a concentration of .51 grams per liter of the liquid settling medium.

The potassium silicate solution referred to in the above example of the screening process is prepared by diluting a commercially available solution with an equal amount of water. The commercially available solution has, for example, the following specifications: molecular ratio $1K_2O:3.9\ SiO_2$, percentage $K_2O=7.8\%$, and specific gravity$=1.25$. As is well understood sodium silicate and variations of the above potassium silicate solution may be employed.

In the above example the undiluted potassium silicate solution was used in the amount of 150 cc. out of a total liquid volume of about 3 liters, or, in other words, about a 5 percent solution. The concentration may be varied appreciably, for example, from 2.5 percent to 10 percent. As the concentration increases the concentration of alkaline earth salt decreases for constant conditions of temperature and pour-off time. Likewise a decrease in potassium silicate concentration requires an increase in the alkaline earth salt concentration, other conditions remaining fixed.

The order in which the different parts of the liquid are added to the bulb as listed above is prefered but not essential. It is very desirable, however, not to add liquid after the phosphor has been added since this tends to disturb any phosphor which may have already settled to the tube face.

As will be well understood by those skilled in the art, the exact materials and the exact amounts of materials used may be varied considerably with a given size bulb and will naturally be varied with different size bulbs. The amount of alkaline earth compound employed may be varied with the other conditions remaining fixed over a moderate range. For example, in a large number of experiments it was found that a concentration of barium nitrate within the range of .1 gram to 1 gram per liter of the liquid in the bulb worked satisfactorily and concentrations less than 2 grams per liter will work satisfactorily in most cases. In any event, as a smaller amount of alkaline earth compound is employed, the time required for settling before pour-off can be initiated increases. If, on the other hand, an excess of the alkaline earth compound is used difficulty is experienced in pouring off because of the excess alkaline earth precipitate present and trouble is also encountered with raster burn in the finished tube. It is apparent, therefore, that the amount of alkaline earth compound required for any particular tube size or quantities of liquid employed may be readily established.

In the specific example given above the barium nitrate was added as a .4% water solution. This very low concentration is desirable since it makes the accurate measurement of the liquid added unnecessary and facilitates mixing with the cushion water. It is apparent, however, that much higher concentration may be employed.

The method of the present invention differs substantially from those employing an ordinary electrolyte in a liquid settling process including a silicate solution. In the processes of the prior art the binder is a silica gel and in the present process the binder is, at least to a large extent, an alkaline earth silicate. This difference is readily apparent from the appearance of the solution during settling and by the results of adding an excess of the alkaline earth compound. If an excess of an ordinary electrolyte is employed gelation occurs very rapidly and the relatively transparent gelatinous body is apparent from an inspection of the bulb. If an excess of the alkaline earth compound, such as barium nitrate, is used there is a large amount of white precipitate present in the liquid. This is barium silicate in this particular case, and even with a substantial excess of barium nitrate gelation does not occur after the expiration of several times the normal time before pour-off. Since the barium silicate is less soluble than the potassium or sodium silicate used, for example, in the prior art process, the resultant screen includes only a very small amount of these silicates.

The basic difference between the present process and prior art processes is also demonstrated by the small amount of alkaline earth salt required as compared with prior art electrolyte. As an example, in the specific example given for screening a ten-inch tube 1.54 grams of barium nitrate were employed. In screening a ten-inch tube in accordance with the prior art and using sodium sulfate, for example, approximately sixty-five grams were employed.

While I have described preferred embodiments of my invention, it will be understood that numerous changes and modifications of the process may be made without departing from the invention in its broader aspects, and I aim, therefore, in the appended claim to cover all such changes and modifications as fall within the true spirit and scope of my invention.

What I claim as new and desire to secure by Letters Patent of the United States is:

The process of liquid settling a phosphor screen on the face of a cathode ray tube bulb which comprises adding to the bulb a quantity of water to provide a cushion, a water solution of a silicate selected from the group consisting of sodium silicate and potassium silicate, a suspension of a powdered phosphor and a water solution of barium nitrate, the amount of barium nitrate being approximately .5 gram per liter of said liquid, allowing the phosphor to settle onto the bulb face and pouring off the liquid.

References Cited in the file of this patent

UNITED STATES PATENTS

| | | |
|---|---|---|
| 2,412,654 | Sadowsky | Dec. 17, 1946 |
| 2,451,590 | Tidik et al. | Oct. 19, 1948 |
| 2,684,306 | Brewer et al. | July 20, 1954 |
| 2,733,163 | Steadman | Jan. 31, 1956 |